C. A. BESEMANN.
MECHANICAL MOVEMENT FOR INDICATING INSTRUMENTS.
APPLICATION FILED DEC. 29, 1913.
1,125,798. Patented Jan. 19, 1915.
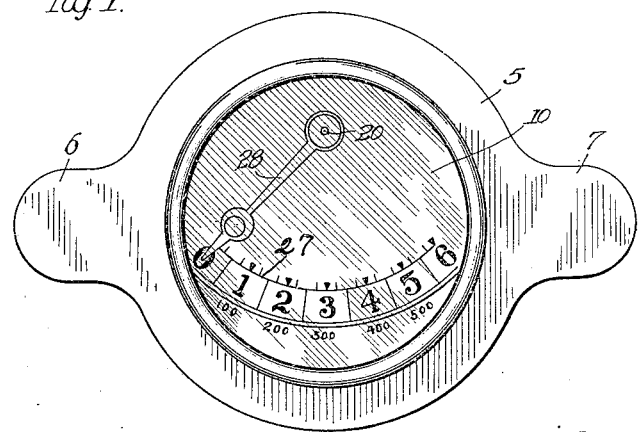
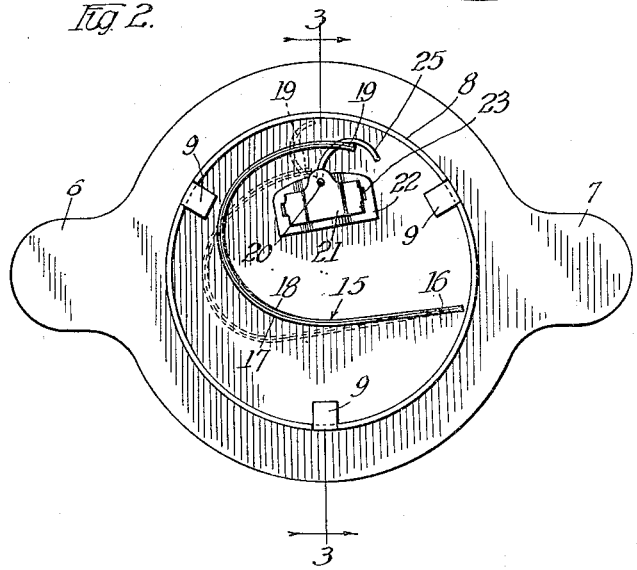
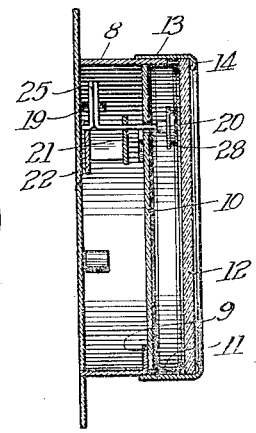
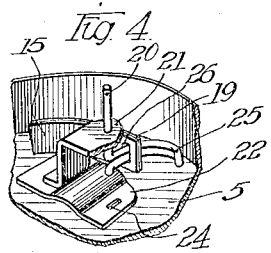
Witnesses:
Robert H. Weir
Arthur W. Carlson
Inventor
Charles A. Besemann

UNITED STATES PATENT OFFICE.

CHARLES A. BESEMANN, OF CHICAGO, ILLINOIS, ASSIGNOR TO SUPERIOR THERMOMETER COMPANY, OF CHICAGO, ILLINOIS, A CORPORATION OF MINNESOTA.

MECHANICAL MOVEMENT FOR INDICATING INSTRUMENTS.

1,125,798.  Specification of Letters Patent. Patented Jan. 19, 1915.

Application filed December 29, 1913. Serial No. 809,202.

*To all whom it may concern:*

Be it known that I, CHARLES A. BESEMANN, a citizen of the United States, residing at Chicago, in the county of Cook and State of Illinois, have invented certain new and useful Improvements in Mechanical Movements for Indicating Instruments, of which the following is a specification.

One of the objects of my invention is to provide an improved mechanical movement for rotating the index, or needle, of thermometers, or like instruments, whereby the needle is positively rotated in both directions without the use of springs or gravity operable means for returning the needle to normal position.

Another object of my invention is to provide a mechanical movement which compensates for the decrease in the relative movement of the heat responsive member for like temperature changes throughout the increasing range of temperature, whereby to move the needle equal distances for given changes, over a scale of uniform graduation that may be marked upon the dial.

Another object of my invention is to generally improve structures of this character to the end that the indicating instrument will remain in true calibration without being permanently affected by relatively high temperatures, as when it is used for indicating the temperatures of baking ovens, or the like.

Other and further objects of my invention will become readily apparent to persons skilled in the art, from a consideration of the following description when taken in conjunction with the drawing wherein—

Figure 1 is a front view of the completed instrument. Fig. 2 is a front view showing the top removed exposing the heat responsive member and showing its association with the mechanical mechanism employed to rotate the needle. Fig. 3 is a transverse section taken on line 3—3 of Fig. 2. Fig. 4 is a fragment of a part of the instrument showing the mechanical movement and its connection with the heat responsive member.

In all the views the same reference characters are employed to indicate similar parts.

5 is a base plate upon which the instrument is mounted, which is generally circular in outline, having lateral projections 6 and 7, by means of which the instrument may be attached to a support.

Mounted upon the base plate 5, and properly secured thereto, is a barrel 8, cylindrical in form and preferably placed concentrically with the cylindrical portion of the plate 5.

Cut from the side wall of the barrel 8 and bent so as to project radially toward the axis thereof are projecting tongues 9—9 of which three are shown, upon which to mount the dial plate 10.

An annular spacing ring 11 rests upon the outer periphery of the dial plate 10 and is the means by which the glass cover plate 12 is spaced apart and supported.

A top or cover engaging annulus 13, has telescopic association with the barrel 8, and is provided with an inturned bead 14, that overlies the outer circumferential edge of the transparent plate 12, to hold the latter in place. The part 13 is secured to the barrel by means of screws, or other suitable fastenings.

A heat responsive member 15, is fixed to the base plate 5 at its end 16, its other end 19 being free to move throughout its full extent without impediment by the base plate. The responsive member 15 consists of a strip 17 having a relatively high heat coefficient of expansion, with reference to the strip 18, with which it is intimately connected, as by welding, brazing or the like, throughout its entire length. Heat responsive devices of this general character are well known in the art and it is understood that the strip 17 may be made of steel, or other material subject to expansion by increase of temperature, and the associate strip 18 may be made of brass, or other material of a relatively lower expansive quality under like temperature conditions, so that the free end 19, of the heat responsive member will move from the position shown in full lines in Fig. 2 to approximately the position shown in dotted lines under the maximum change of temperature for which the instrument is designed, the path of movement being in a plane at right angles to the axis of the index shaft and oblique to a radial plane.

An index shaft 20, is pivoted in a bracket 21, and in a raised plate 22; the bracket and the plate being secured to the base plate 5, by tongues 23 that are provided on the respective ends of the bracket, and which pass through perforations 24 that are made through the plate 22 and through the base plate 5. After passing the tongues through these perforations they are bent at right angles thereto so as to hold the structure in place upon the base plate.

The dial shaft 20 is provided between its respective bearings with a laterally projecting curved cam or arm 25, in the present instance it consists of a wire bent upon itself to form the cam, the ends of which are bent at right angles to occupy the same axial position to constitute the index shaft. The projecting cam 25 is curved in a plane transverse to the axis of the shaft 20 and away from the direction of its initial or indicating movement, it is passed through a perforation 26, made in the end 19 of the heat responsive member 15, whereby it may be positively moved in its indicating and return movement.

The dial 10 is uniformly graduated, as at 27, and an index, or needle 28, is secured to the shaft 20, and is adapted to sweep over the face of the dial 10, when the shaft 20 is oscillated.

The free end 19, of the heat responsive member 15, is shown connected to the curved projecting cam 25 at a point relatively remote from the shaft 20. As the operative displacement of the free end 19, of the heat responsive member is greater, proportionately, with a given change of temperature, upon the lower scale of its range, than with a change of the same number of degrees at a higher temperature, and as the free end 19 of the responsive member approaches nearer to the shaft 20, as the temperature increases, the point of engagement between said heat responsive device and the cam 25 approaches nearer to the axis of the shaft, the relative movement of the needle 28 will be greater for a given movement of the heat responsive member when the operative parts thereof occupy positions shown in dotted lines in Fig. 2, than when they are in the position shown in full lines, and this relation exists, proportionately, at all intermediate points, so that the index will be moved practically the same distance over the indicating scale for any given rise of temperature, between any two points, within the range of its movement.

When the device has been subjected to the highest temperature, within its intended operation, the parts will be approximately in dotted line position, and when it has been removed from the influence of the higher temperature the parts will return to the position shown in full lines in Fig. 2. As there is a positively operating connection between the cam 25 and the heat responsive member 15, springs, or like devices, which are subject to permanent change by the higher temperatures are not required and therefore the instrument will remain in true calibration and not permanently affected by the higher range of temperature.

I desire it to be understood that my invention is not limited to use of a heat responsive member 15 as a Bordon tube, such as used in steam gages, or vacuum gages, may be employed with equal benefit and levers in general arrangement similar to those shown may be used in connection with electro-responsive means, such as electromagnets, solenoids and the like within the contemplation of my invention.

Having described my invention what I claim with a view and desire to secure by Letters Patent is:—

A mechanical movement for indicating instruments comprising an index shaft, carrying an index to be oscillated; a cam arm projecting laterally from said shaft and curved in the plane of its movement away from the direction of its indicating movement; a member movable in response to varying conditions, having a fixed end and a perforate free end, the latter overlying said cam arm, said free end movable initially in a plane at right angles to the axis of the shaft and constantly changing its point of contact with said cam during its movement whereby to rotate said shaft proportionately greater as the relative extent of movement of said responsive member decreases, and to positively return said index to normal position.

In testimony whereof I hereunto set my hand in the presence of two witnesses.

CHARLES A. BESEMANN.

In the presence of—
 FOREÉ BAIN,
 MARY F. ALLEN.

Copies of this patent may be obtained for five cents each, by addressing the "Commissioner of Patents, Washington, D. C."